Patented Oct. 6, 1942

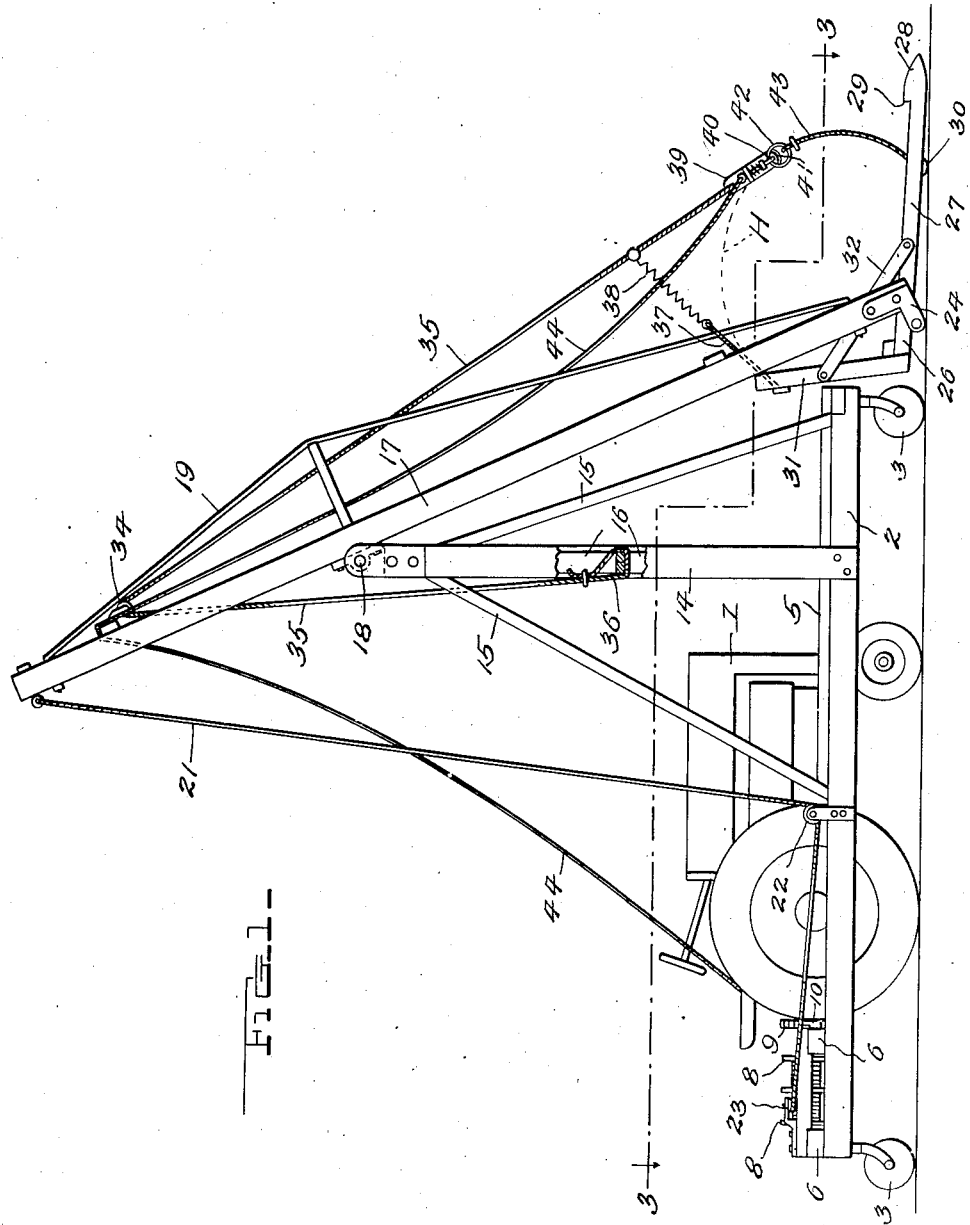

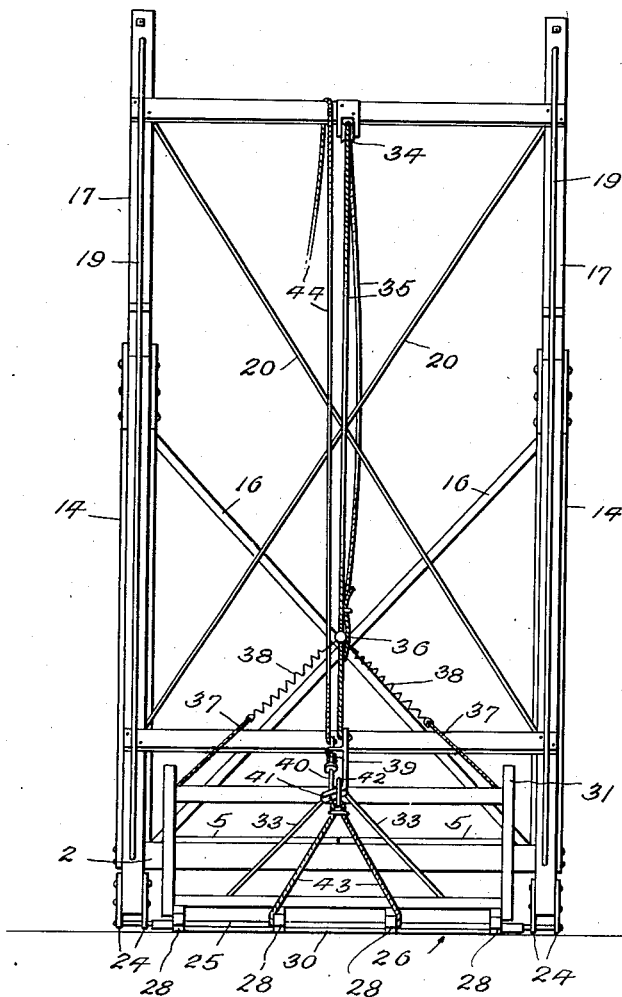

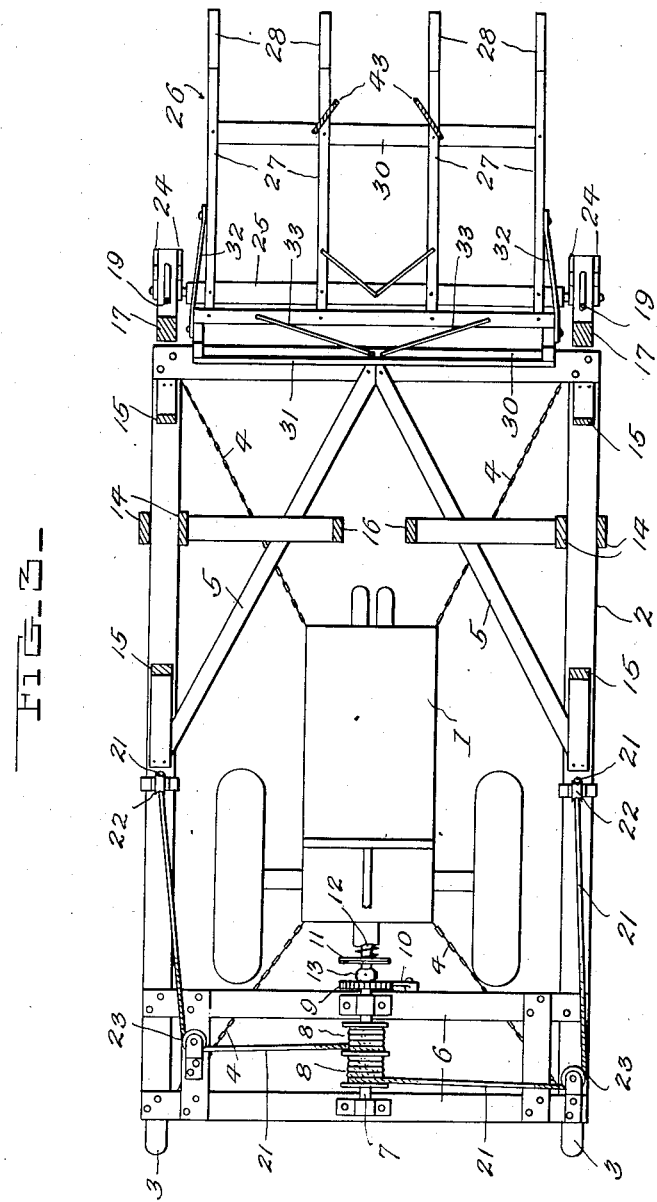

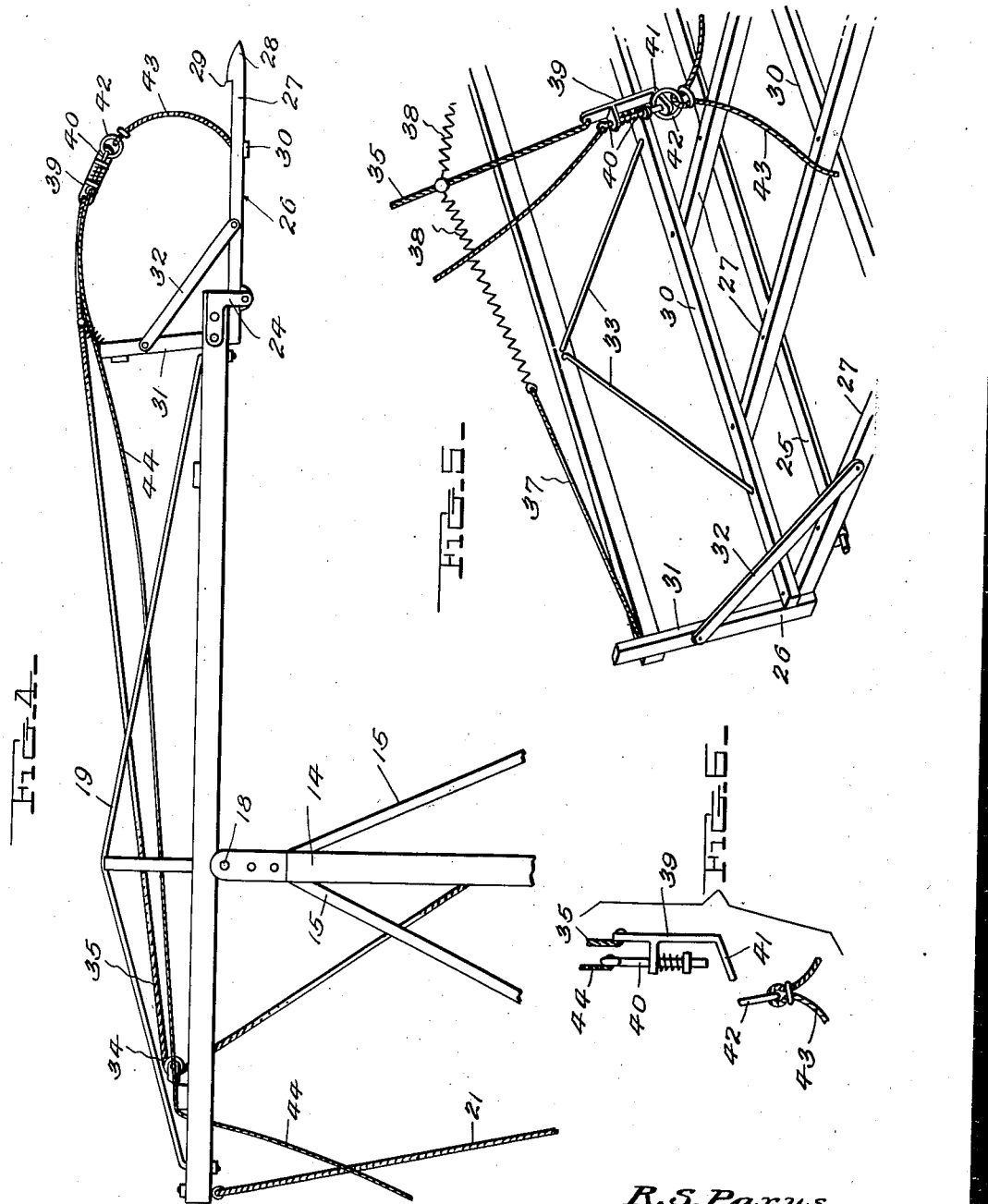

2,298,256

UNITED STATES PATENT OFFICE 2,298,256

HAY STACKER

Raymond S. Parus, Tuscarora, Nev.

Application September 26, 1941, Serial No. 412,498

1 Claim. (Cl. 214—140)

This invention relates to a hay stacker one of the objects being to provide a structure to be used as an attachment for a tractor, it being possible to position the tractor within the hay stacker structure and is so connected thereto that the parts will move together, the said arrangement greatly reducing the overall length of the tractor and stacker as compared with structures wherein the stacker is positioned in front of the tractor.

A further object is to provide the hay stacker with simple and efficient means for swinging its lifting frame, additional means being employed for retaining the load on the fork during the lifting operation and for releasing it when the load has reached the point of delivery.

Another object is to provide a pivotally mounted fork having yielding means whereby it can be brought to proper position on the ground when lowered to receive another load.

A still further object is to provide a stacker which, by being located around the tractor, can be turned more readily without necessitating the wide sweeping action of stackers generally employed.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

In the accompanying drawings the preferred form of the invention has been shown.

In said drawings

Figure 1 is a side elevation of the stacker in loading position, a portion being broken away, and the load-retaining element being shown in active position.

Figure 2 is a front elevation of the stacker, the tractor being removed.

Figure 3 is a section on line 3—3, Figure 1.

Figure 4 is a side elevation of the hoisting frame in raised position preparatory to delivering a load.

Figure 5 is a perspective view of a portion of the fork showing the load-retaining device.

Figure 6 is a detail view of the latch portion of the load-retaining device.

Referring to the figures by characters of reference, 1 designates a tractor of any desired construction and surrounding this tractor is a rigid frame 2 which, as shown, can be provided at its corners with caster wheels 3. Chains 4 or the like can connect the corner portions of the frame 2 to corner portions of the tractor as shown in Figure 3 so that when the parts are thus assembled, the frame 2 will follow the movements of the tractor, advancing and swinging therewith. The frame 2 can be suitably reenforced by braces 5 or the like and is provided at its rear end with cross-beams 6 on which is mounted a shaft 7 carrying reels 8. This shaft has a ratchet wheel 9 adapted to be engaged by a dog 10 so as to prevent rotation of the reels in one direction. A clutch 11 of any desired construction can be utilized for transmitting motion to the shaft from the shaft 12 of the tractor. Obviously a portion of the shaft 7 between the clutch 11 and wheel 9 can be provided with a universal joint 13 or the like whereby a limited relative movement between the shaft 12 and frame 1 is permitted. The construction of such a joint is so well known that it has not been deemed necessary to describe or show the same in detail.

Mounted on each side of frame 2 adjacent its front end is a standard 14 having front and back braces 15, the two standards being also connected by transverse crossed braces 16. A lifting frame 17 is pivotally connected at 18 to the upper ends of the standards 14 and each side portion of the frame is reenforced longitudinally by a truss 19. The lifting frame can also be reenforced by crossed braces 20 connecting the sides thereof.

The lifting frame is so proportioned that, when it is in one extreme position, the forward end thereof will be located close to the surface on which the wheels 3 are mounted while the other end will be supported in an elevated position above a portion of the tractor. To the sides of the frame 17 at the upper or elevated end thereof are attached cables 21 which extend downwardly under guide pulleys 22 and thence rearwardly around guide pulleys 23 to the respective reels 8 to which they are secured. These cables are so arranged on the reels that when the shaft 7 is rotated in one direction both cables will be wound simultaneously, the dog 10 cooperating with the ratchet wheel 9 to prevent them from unwinding. By releasing clutch 11 the reels can be freed for free rotation, thereby allowing the lifting frame and the parts carried thereby to swing to the position shown in Figure 1.

Secured to the sides of the forward end of lifting frame 17 are brackets 24 in which are journaled the ends of a cross-bar 25 forming a part of the rear portion of a fork 26. The tines 27 of the fork are spaced apart desired distances and can be provided, at their forward ends with pointed fingers 28 and retaining shoulders 29. These tines are connected at desired intervals by cross-strips 30 in addition to the part 25. The fork is provided with an upwardly extended back frame 31 suitably braced as at 32 against shifting relative to the fork and also provided with suitable transverse braces 33.

A pulley 34 is carried by the upper portion of the frame 17 adjacent to the center thereof and guided thereon is a controlling cable 35 one end of which is fixedly attached to the frame 14 as indicated at 36, while the other end is joined to the side portions of the back frame 33 by diverging cables 37 each of which is connected to the cable 35 by coiled springs 38 or other suitable elastic means. Cable 35 is also attached to a latch member 39 having a spring-pressed sliding bolt 40 which is normally projected through an opening in an inclined shoulder 41. This bolt, when in its normal position, is adapted to extend through a ring 42 carried by a looped cable 43 the ends of which are attached to two of the tines of the fork near the forward or free ends thereof. A tripping rope 44 is attached to bolt 40 and is extended over the upper portion of frame 17 and thence downwardly to a point where the operator of the tractor 1 can reach it readily for the purpose of actuating it.

Normally the fork 26 is located close to or in contact with the ground where it is supported by the pull of cable 35, cables 37, and the springs 38. When the tractor and stacker are pushed forwardly into the hay in the path thereof, the fork will gather a portion of the material so as to form a bundle on the fork as indicated by broken lines at H in Figure 1. When the hay is thus accumulated, cable 35 is pulled downwardly to the position shown in Figure 1 and the latch 39 is secured to the ring 42 by inserting jaw 41 into the ring and releasing the bolt to retain the ring on the jaw. Thus the parts will act to bind upon the load as indicated in Figure 1. Thereafter the reels 8 are operated to wind the cables 21 and this will cause the cables to pull downwardly on the upper end of frame 17 with the result that the fork will be swung upwardly as indicated, for example, in Figure 4. During this upward movement the cable 35 will be paid out so that the fork can maintain a substantially horizontal position with the load thereon. The stacker can then be moved to the point where the load is to be delivered whereupon the tripping cord 44 is pulled to disengage bolt 40 from ring 42. Thus the ring is free to slip off of jaw 41 and the retaining cord or cable 43 will release the load and also release the fork for downward swinging movement under the weight of the load. Consequently the load will slip off of the tines. As soon as this delivery has been effected the stacker is moved back into position to receive another load and cables 21 are paid out to allow the frame 17 again to swing downwardly. During this downward swinging movement the springs 38, which at that time are contracted, will maintain the fork substantially horizontal until it comes into contact with the ground. A new load is then placed on the fork, cable 35 is pulled against the action of springs 38 into the position shown in Figure 1 and held by the cables 43 and the latch 39 whereupon the foregoing operation can be repeated.

It is to be understood that in lieu of providing separate wheels or casters for the frame 2, said frame could be rigidly connected to the tractor frame so as to be supported by the tractor wheels. Such a construction has not been shown because it is thought that the modification can be readily understood.

What is claimed is:

The combination with a tractor, of an attachment therefor including a main frame, wheels for supporting the main frame independently of the tractor, said main frame being extended around the tractor, means connecting the main frame to the tractor for back and forth and swinging movement with the tractor, a lifting frame, means for pivotally supporting the lifting frame above and for transmitting the weight thereof to the main frame, a fork pivotally mounted within one end portion of the lifting frame, a controlling cable anchored at one end and movably engaged by the lifting frame, a yielding connection between said cable and one end of the fork for maintaining the fork in a substantially horizontal position during the swinging movement of the lifting frame, operating cables connected to one end portion of the lifting frame, and means operated by the tractor for winding said cables to swing the lifting frame and raise the fork.

RAYMOND S. PARUS.